United States Patent
Rosen et al.

(10) Patent No.: US 6,179,263 B1
(45) Date of Patent: *Jan. 30, 2001

(54) STOWABLE SUPPORT APPARATUS

(75) Inventors: John B.. Rosen; James C. LeVine, both of Eugene, OR (US)

(73) Assignee: Rosen Products LLC, Eugene, OR (US)

( * ) Notice: Under 35 U.S.C. 154(b), the term of this patent shall be extended for 0 days.

This patent is subject to a terminal disclaimer.

(21) Appl. No.: 09/455,263

(22) Filed: Dec. 6, 1999

Related U.S. Application Data

(63) Continuation of application No. 08/949,612, filed on Oct. 14, 1997, now Pat. No. 5,996,954.

(51) Int. Cl.$^7$ .................................................. E04G 3/00
(52) U.S. Cl. ..................... 248/278.1; 248/286.1; 248/279.1; 248/918; 297/217.3; 297/194
(58) Field of Search ................ 248/278.1, 283, 248/917, 918, 999, 920, 921, 922, 923, 924, 296.1, 280.1, 584, 286.1, 279.1; 297/188.15, 188.16, 188.17, 145, 217.3, 194; 312/254, 229, 248, 249; D14/114, 239

(56) References Cited

U.S. PATENT DOCUMENTS

| | | | |
|---|---|---|---|
| D. 250,630 | 12/1978 | Allegretti | D8/107 |
| D. 263,250 | 3/1982 | McAuliffe | D21/777 |
| D. 282,433 | 2/1986 | Rauen et al. | D7/682 |
| D. 360,126 | 7/1995 | Rosen | D8/349 |
| D. 367,477 | 2/1996 | Rosen | D14/452 |
| D. 391,243 | 2/1998 | Rosen | D14/452 |
| D. 391,262 | 2/1998 | Rosen | D14/239 |
| D. 395,874 | 7/1998 | Rosen | D14/452 |
| D. 396,042 | 7/1998 | Rosen | D14/239 |
| 3,637,184 | 1/1972 | O'Brien | 248/279.1 |
| 3,662,981 | 5/1972 | Hogrebe | 248/278.1 |
| 5,683,064 | 11/1997 | Copeland et al. | 248/278.1 |
| 5,709,360 | 1/1998 | Rosen | 248/278.1 |
| 5,996,954 | 12/1999 | Rosen et al. | 248/278.1 |
| 6,007,036 | * 12/1999 | Rosen | 248/286.1 |
| 4,455,008 | 6/1984 | MacKew | 248/447.1 |
| 4,508,364 | 4/1985 | Joseph | 280/321 |
| 4,708,312 | 11/1987 | Rohr | 248/281.11 |
| 4,836,486 | 6/1989 | Vossoughi et al. | 248/281.11 |
| 5,076,524 | 12/1991 | Reh et al. | 248/296.1 |
| 5,177,616 | 1/1993 | Riday | 348/837 |
| 5,179,447 | 1/1993 | Lain | 348/837 |
| 5,195,709 | 3/1993 | Yasushi | 248/280.11 |
| 5,213,296 | 5/1993 | Lee | 248/166 |
| 5,222,780 | 6/1993 | Reh et al. | 297/188.19 |
| 5,244,254 | 9/1993 | Irwin | 297/344.22 |
| 5,271,590 | 12/1993 | Rosen | 248/222.13 |
| 5,275,364 | 1/1994 | Burger et al. | 248/125.1 |
| 5,316,369 | 5/1994 | Kanda | 297/188.15 |
| 5,374,104 | 12/1994 | Moore et al. | 297/188.16 |
| 5,547,248 | 8/1996 | Marechal | 297/188.17 |
| 5,564,667 | 10/1996 | Copeland et al. | 248/278.1 |
| 5,582,379 | 12/1996 | Keselman et al. | 248/279.1 |
| 5,611,513 | 3/1997 | Rosen | 248/222.11 |
| 5,667,179 | 9/1997 | Rosen | 248/278.1 |

FOREIGN PATENT DOCUMENTS 0 368 609   5/1990   (EP) .

* cited by examiner

*Primary Examiner*—Anita M. King
(74) *Attorney, Agent, or Firm*—Kolisch, Hartwell, Dickinson, McCormack & Heuser

(57) ABSTRACT

A stowable support apparatus is disclosed and includes a base with a support arm pivotally coupled to the base. The support arm is pivotal between a stowed position and a display position, and it has a display unit coupled thereto distal the base. The apparatus further includes a lock mechanism that is configured to retain selectively the support arm in the stowed or the display position, and the lock mechanism is housed substantially, or completely, within the support arm. In some embodiments of the invention, the apparatus includes a sensor for detecting and indicating when the support arm is in its stowed position. In other embodiments, the apparatus further includes a mounting bracket mounted on the support arm distal the base. The display unit is mounted on the mounting bracket, and the mounting bracket enables pivotal and rotational movement of the display unit with respect to the support arm.

31 Claims, 7 Drawing Sheets

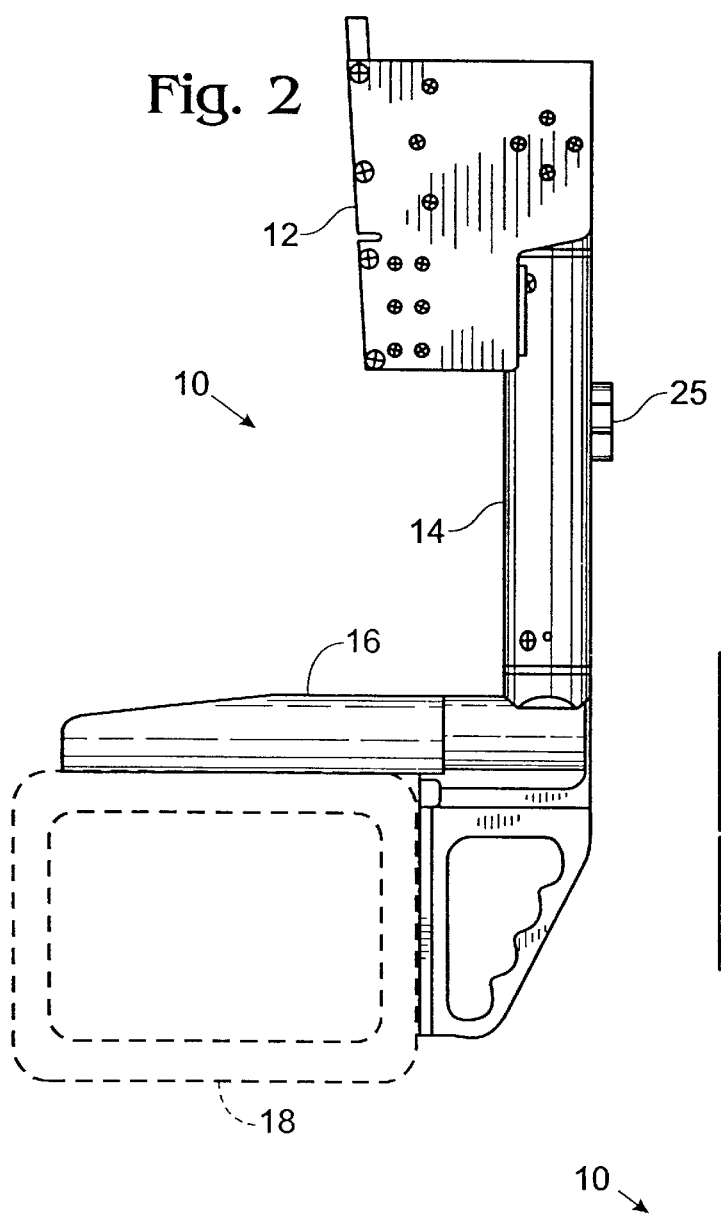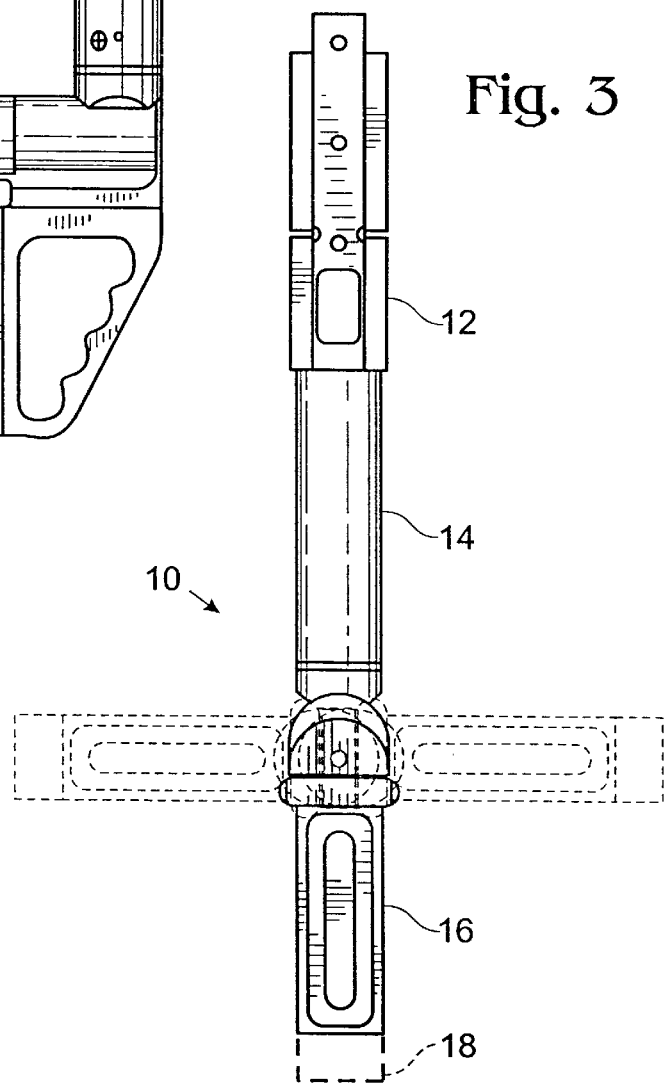

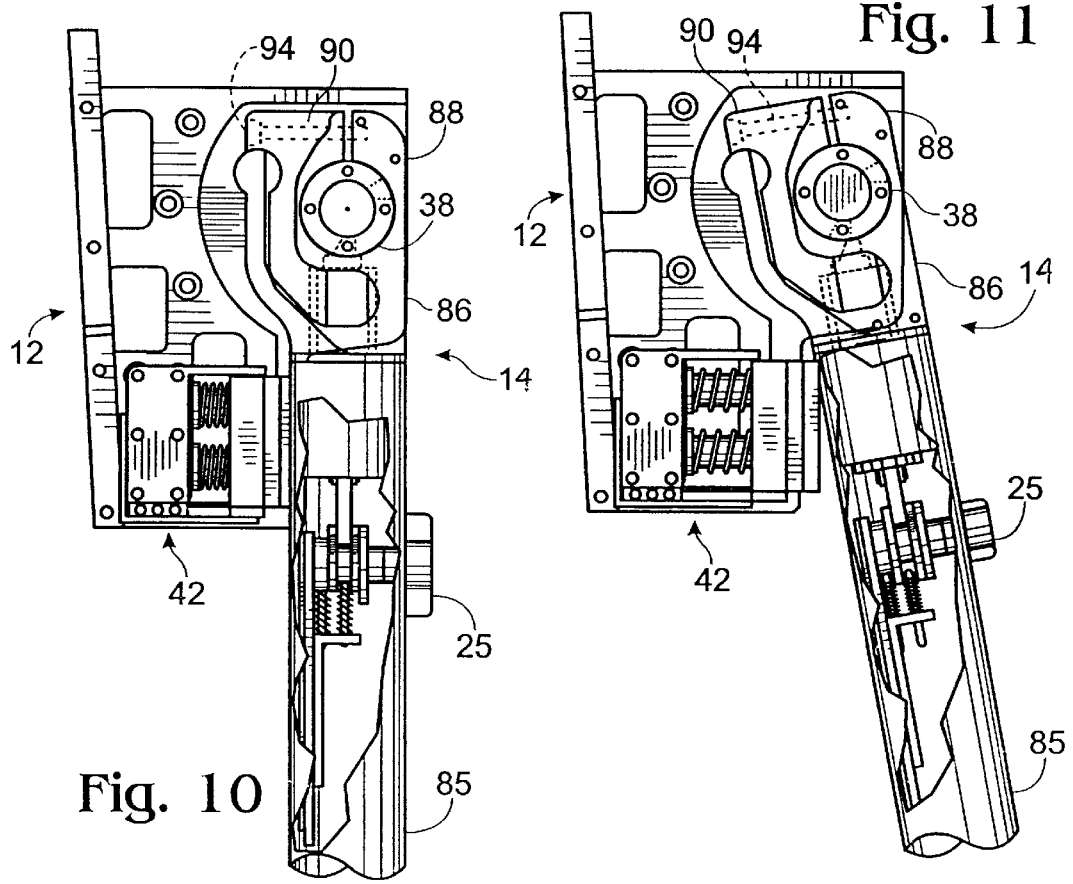
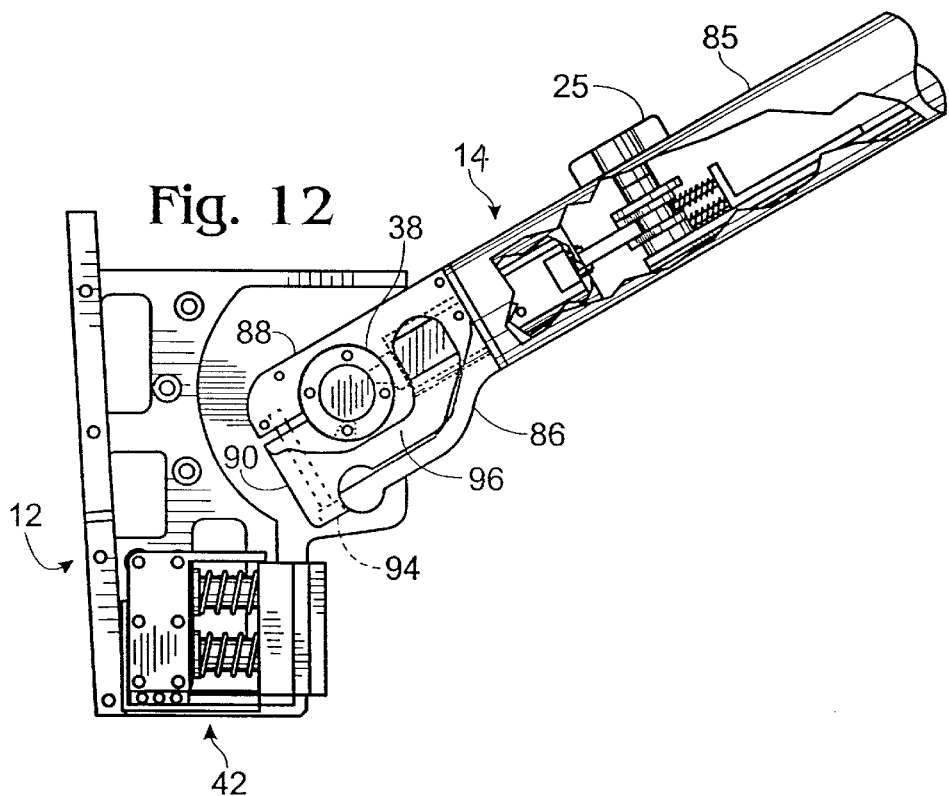

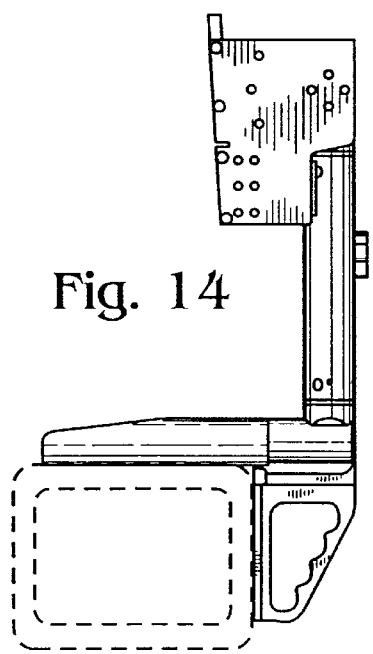
Fig. 14
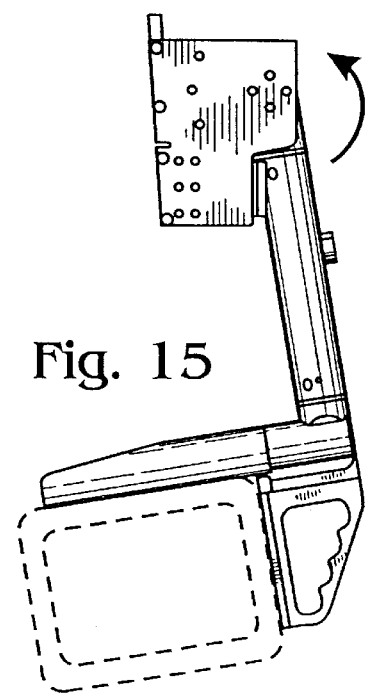
Fig. 15
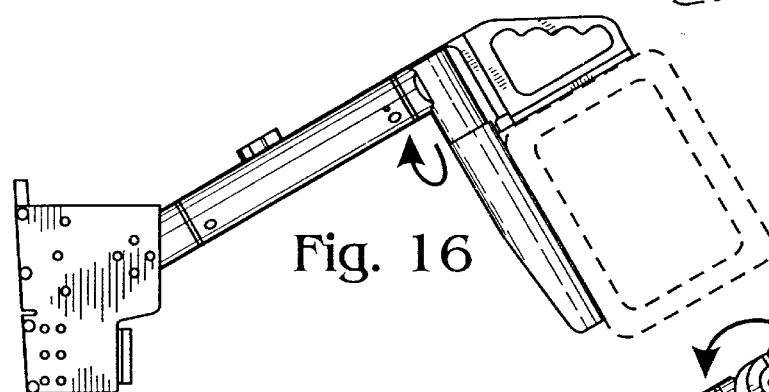
Fig. 16
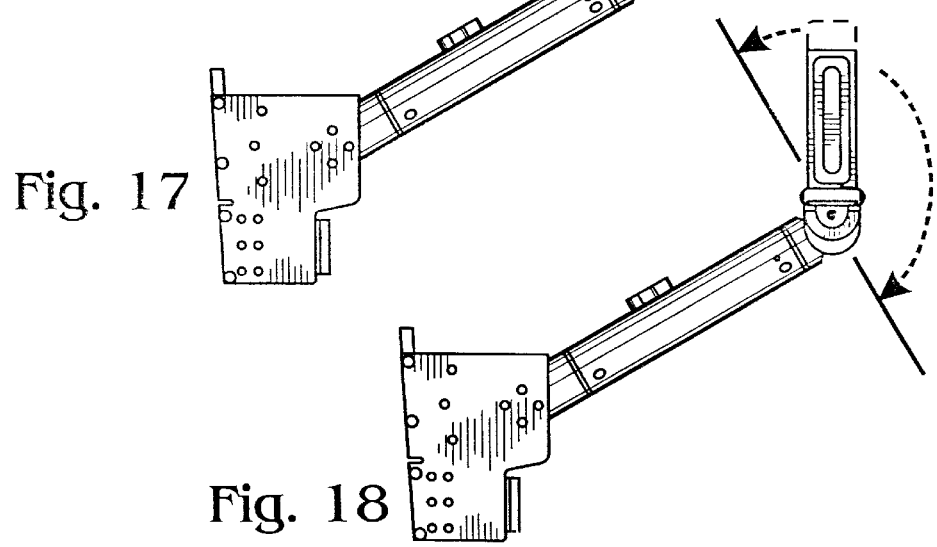
Fig. 17
Fig. 18

STOWABLE SUPPORT APPARATUS

CROSS-REFERENCES TO RELATED APPLICATION

This application is a continuation of U.S. patent application Ser. No. 08/949,612, filed Oct. 14, 1997 of John B. Rosen and James C. Levine for a STOWABLE SUPPORT APPARATUS, which will issue Dec. 7, 1999 as U.S. Pat. No. 5,996,954.

FIELD OF THE INVENTION

The present invention relates generally to support structures for display units, and more particularly to an apparatus for supporting a display unit and selectively positioning the display unit between a stowed position and a display position.

BACKGROUND AND SUMMARY OF THE INVENTION

In confined places such as aircraft and other vehicular passenger compartments, space is at a premium. Appliances such as flat-panel television and display monitors are important to many travelers, but must be provided with the capability of being stowed out of the way of the passengers and crew when not in use. Nonetheless, deployable/stowable appliances must be quickly and easily positionable by the user and should be as nearby as possible, preferably being built into the passenger's seat or an adjacent structure. Due to space constraints in such areas, however, efficient storage of the apparatus and its supported display unit is necessary. Because of the relatively low-slung seats that are typical on most commercial and private aircraft, unusual vertical space limitations further constrain the design of what will be referred to herein as a stowable support apparatus. The apparatus is used to support and position a display unit, which may include, for example, a television screen, a monitor for a computer or other interactive device, or other devices for displaying visual or audio-visual information to a viewer.

The utility of such an apparatus is especially recognized in environments such as airplanes, buses and other land vehicles, or in terminal areas. The apparatus provides the user with entertainment and/or allows the user to work. For instance, a television monitor may be utilized to display a movie or some other form of entertainment. Alternatively, the display unit may come in the form of a computer monitor operably connected to a computer to enable the user to work while traveling. Such an apparatus, because of its close proximity to the user's seat, must be stowable during ingress and egress so that it does not interfere with passenger movement. Moreover, after a passenger is seated, the apparatus should be accessible in an ergonomically advantageous way.

The user also should be able to position selectively the display unit for comfortable viewing angles. Because travelers, and seating areas therefor, may differ dramatically in size and shape, the support apparatus must be adjustable to present the display unit at a user-selected viewing angle, regardless of the size or shape of the particular seat or user. Furthermore, even similarly sized individuals may have different preferred viewing angles. Therefore a stowable support apparatus not only should adjust between a stowed and a display, or user-viewable, position, but also should enable a user to adjust selectively the viewing orientation of the display unit to suit that user's particular needs or preferences.

Safety is also of utmost importance when such an apparatus is used by a passenger while a vehicle is in transit. Sudden stops, starts, or changes in direction could cause the apparatus, including its display unit, to fly out of control and damage the unit or injure the intended user or nearby passengers. Therefore there is a need for a stowable support apparatus which is constrained from freely moving or otherwise adjusting when the vehicle or passenger undergoes sudden stops or movements. A competing, and equally important concern, however, is that the apparatus must collapse or yield if impacted by the user, such as during a collision or rapid change in direction or speed. If the device remains rigidly positioned when impacted, the user is prone to severe injury when he or she impacts this non-yielding structure. To satisfy both concerns, the apparatus should retract or otherwise pivot to a safe position when struck by a user or other object, yet resist changes in position solely on account of changes in the vehicle's speed or direction.

Although a number of stowable monitor supports are known in the prior art, such supports are unsatisfactory due to their failure to address and satisfy all of the concerns listed above.

With the above problems in mind, it is an object of the present invention to provide a stowable support apparatus that positions and supports a display unit.

Another object is to provide a stowable support apparatus that is adjustable from a stowed position, in which an attached display unit is stored and protected in an out-of-the-way position, and a display position, in which the display unit is presented for viewing by the user.

It is another object to provide a stowable support apparatus that is adjustable by the user to multiple positions for satisfing ergonomic requirements.

Still another object of the invention is to provide a stowable support apparatus that may be easily pivoted out of the way in the event of an emergency.

The invention achieves these and other objects and advantages in the form of a stowable support apparatus that includes a base with a support arm pivotally coupled to the base. The support arm is pivotal between a stowed position and a display position, and it includes a display unit coupled thereto distal the base. The apparatus further includes a lock mechanism that is configured to retain selectively the support arm in the stowed or the display position, and the lock mechanism is preferably substantially housed within the support arm. In some embodiments of the invention, the apparatus includes a sensor for detecting and indicating when the support arm is in its stowed position. In other embodiments, the apparatus flier includes a mounting bracket mounted on the support arm distal the base. The display unit is mounted on the mounting bracket, and the mounting bracket enables pivotal and rotational movement of the display unit with respect to the support arm.

These and other advantages and features of the invention will become more filly apparent as the detailed description below is read with reference to the accompanying drawings.

BRIEF DESCRIPTION OF THE DRAWINGS

FIG. 2 is a rear elevation view of the apparatus shown in FIG. 1.

FIG. 3 is a side elevation view of the apparatus shown in FIG. 2 in its stowed position, with a portion of the base broken away to reveal details of internal construction.

FIG. 10 is a fragmentary side elevation view of the base, locking mechanism and support arm shown in FIG. 1 in a stowed position, with a portion of the base and the support arm broken away to show details of internal construction.

FIG. 11 shows the base, support arm and locking mechanism of FIG. 10, with the locking mechanism actuated and the support arm pivoted to an intermediate position.

FIG. 12 shows the base, support arm and locking mechanism of FIG. 11, with the support arm in display position.

FIG. 14 is a side elevation view of the apparatus with the support arm in a stowed position, similar to the view shown in FIG. 2.

FIG. 15 is a side elevation view of the apparatus shown in FIG. 14, with the support arm in an intermediate position.

FIG. 16 is a side elevation view of the apparatus shown in FIG. 15, with the support arm pivoted to a display position.

FIG. 17 is a side elevation view of the apparatus shown in FIG. 16, with the display unit rotated about the longitudinal axis of the support arm to position the display unit for viewing by a user.

FIG. 18 is a side elevation view of the apparatus shown in FIG. 17 with the display unit pivoted about an axis transverse to the longitudinal axis of the support arm, to position further the display unit for viewing by a user.

DETAILED DESCRIPTION OF THE PREFERRED EMBODIMENTS AND METHOD OF USING THE SAME

Figure 1:
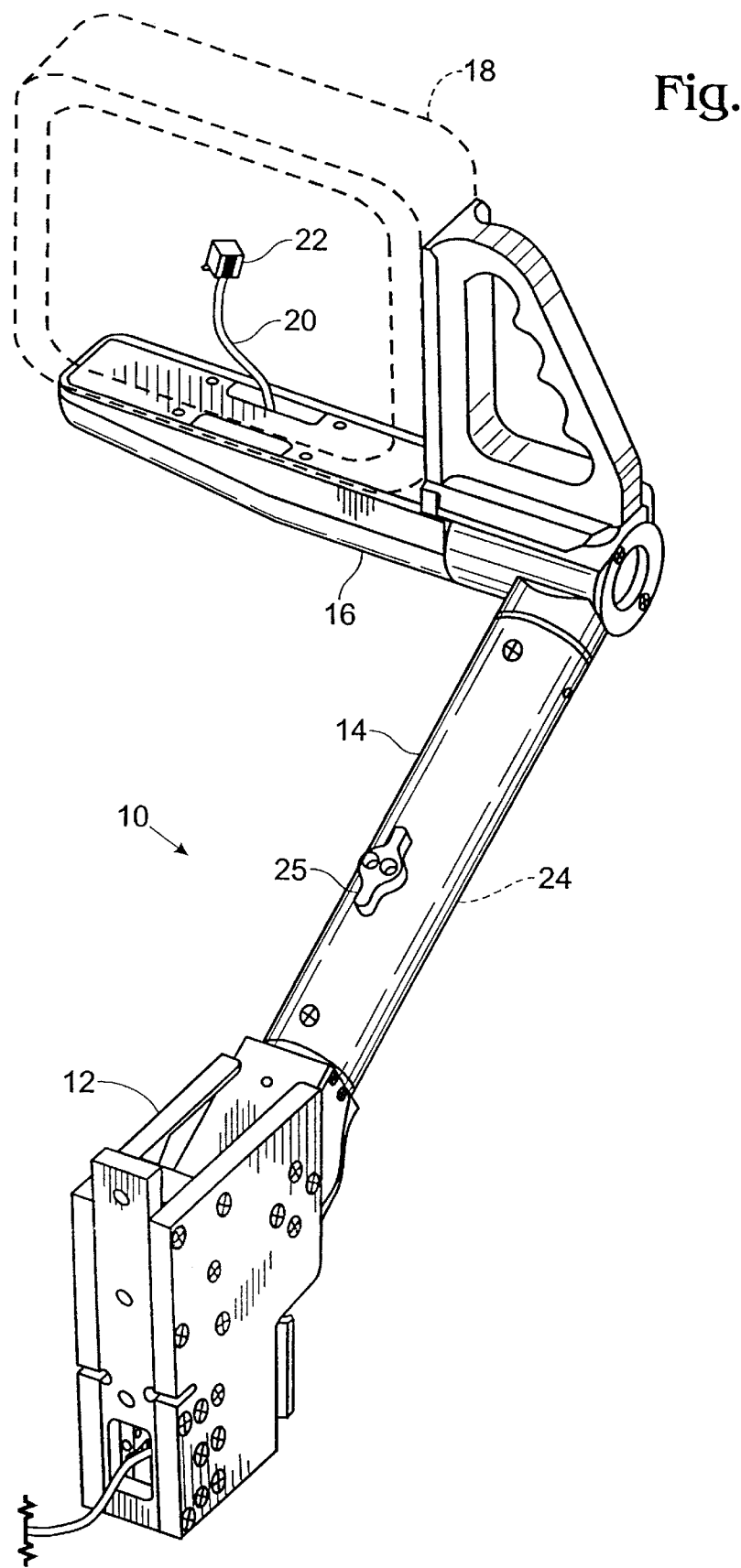
FIG. 1 is an isometric view showing a stowable support apparatus constructed according to a preferred embodiment of the invention and showing a display unit in dashed lines.

A stowable support apparatus constructed according to a preferred embodiment of the present invention is shown in FIGS. 1–3 and generally indicated at 10. Apparatus 10 includes a base 12, a support arm 14 pivotally coupled to base 12, a mounting bracket 16 coupled to the end of support arm 14 distal base 12, and a display unit 18 (shown in dashed lines) mounted on mounting bracket 16. As shown in FIG. 1, a cord 20 with an outlet 22 is threaded through apparatus 10 to deliver power to and/or establish communication with display unit 18 from a source (not shown).

A lock mechanism 24 is substantially housed within support arm 14 and cooperates with base 12 to selectively enable arm 14 to pivot with respect to base 12 between stowed, intermediate and display positions. In FIG. 1, apparatus 10 is shown in a display position. In FIGS. 2 and 3, apparatus 10 is shown in a stowed position, with alternative stowed positions shown in dashed lines in FIG. 3.

Preferably, apparatus 10 is mounted within or adjacent a user's seat, with base 12 secured generally at a height proximate the user's knees or lap, with support arm 14 oriented to extend downwardly toward and beside the user's feet when the arm is in its stowed position, and generally upwardly at an angle above the user's legs and/or lap when it is in the display position.

Figure 4:
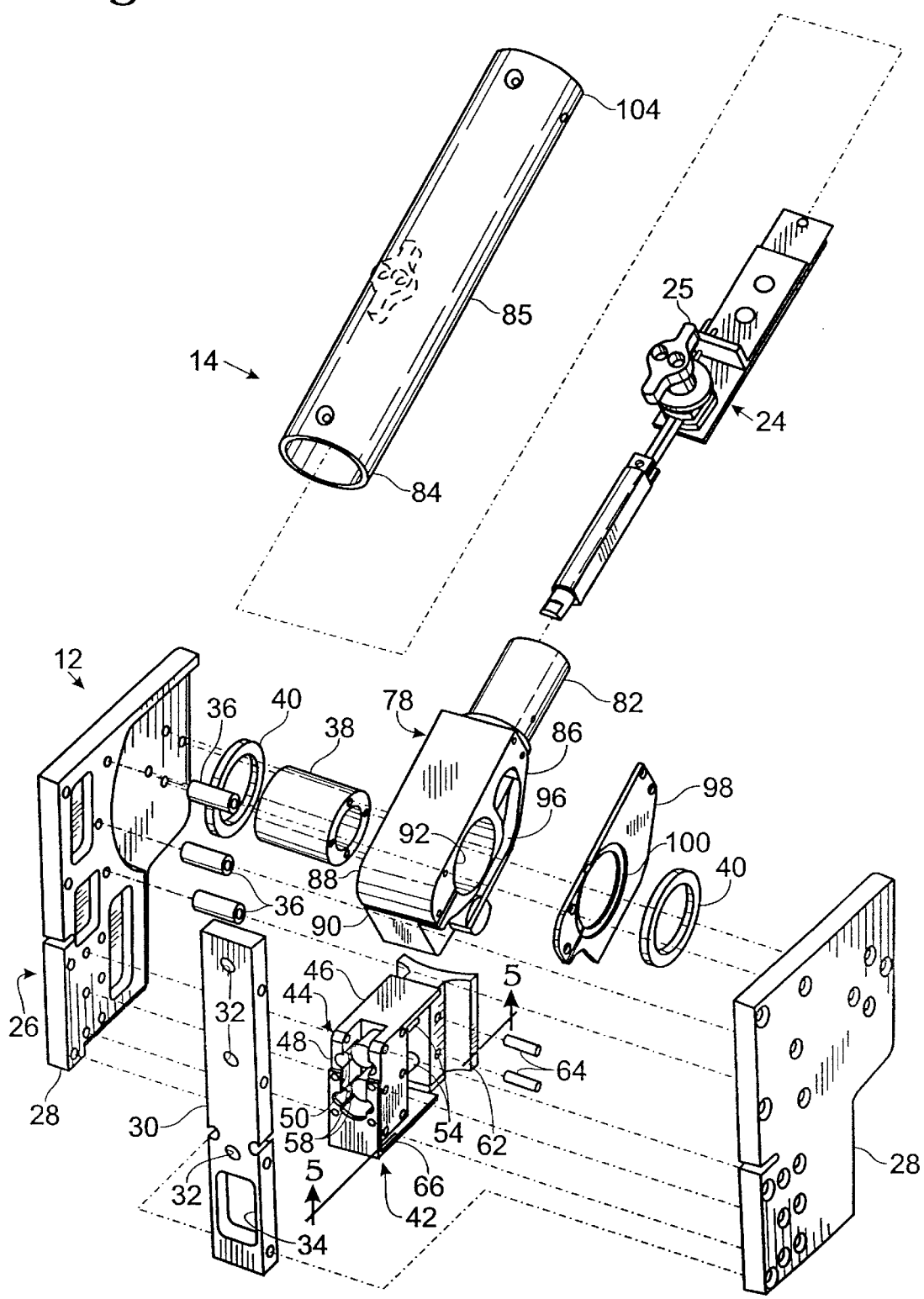
FIG. 4 is an isometric, exploded view of the base, support arm and lock mechanism of the apparatus shown in FIG. 1.

As shown in more detail in FIG. 4, base 12 includes a housing 26 with a pair of opposed side walls 28 and an elongate end wall 30 extending therebetween. End wall 30 includes a plurality of apertures 32 for securing apparatus 10 in a desired operative position, as well as port 34 through which a cord extends. Port 34 defines one end of a passage which extends through base 12, support arm 14 and mounting bracket 16, and though which a cord extends and is protected from wear or damage, as well as from interfering with the pivotal and other movements of the elements of apparatus 10. A plurality of spacers 36 extend between side walls 28 to support and add stability to base 12, as well as to maintain the side walls in a defined, spaced-apart relationship to each other.

End wall 30 and spacers 36 are mounted to side walls 28 with screws, which are preferably pretreated with Loc-Tite, Loc-Patch or another suitable binder to prevent the unintentional removal of the screws. In fact, all screws and similar fasteners shown or discussed herein should be pretreated as discussed above. Similarly, all internal surfaces which engage and move relative to an adjacent surface should be coated with a teflon-based grease, such as Magnalube-g.

Base 12 further includes a bearing insert 38, or hub, which is shown in FIG. 4 and has a generally cylindrical configuration. Bearing insert 38 is secured in a defined position with respect to each side wall 28 via a plurality of screws. Although not shown in FIG. 4 (but shown in FIGS. 7–10), insert 38 includes a plurality of stops or detents which are radially spaced-apart along insert 38 and which are engaged sequentially by lock mechanism 24 to secure support arm 14 in one of its defined positions, such as its stowed or its display positions, with respect to base 12. A rotational bearing 40 is retained about each end of bearing insert 38, adjacent its connection to the corresponding side wall. Bearings 40 are preferably constructed from brass and should be lubricated prior to insertion about the ends of bearing insert 38.

Figure 5:
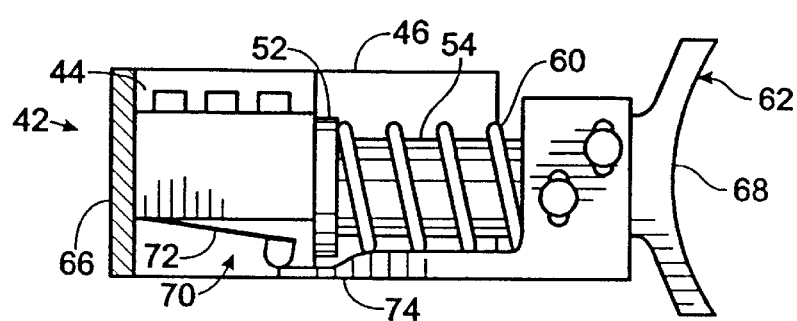
FIG. 5 is an enlarged detail taken along line 5—5 in FIG. 4 and showing a portion of the bias mechanism shown in FIG. 4.
Figure 6:
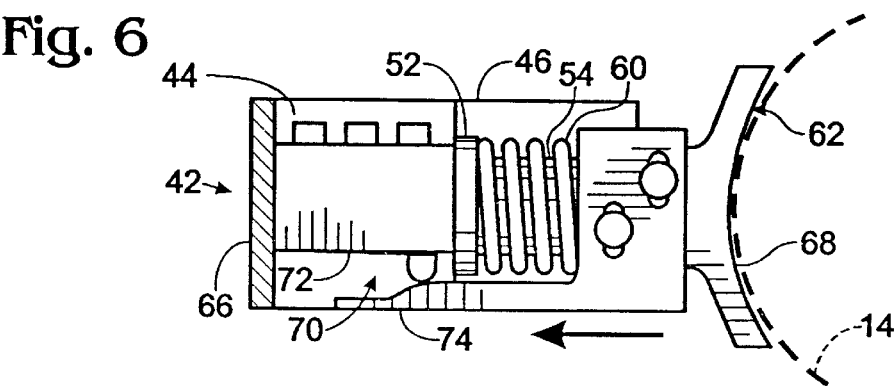
FIG. 6 shows the bias mechanism of FIG. 5 engaged by the support arm.

Apparatus 10 further includes a bias mechanism 42, which is perhaps best seen in FIGS. 4–6. Bias mechanism 42 urges support arm 14 away from base 12 when the arm is in its stowed position and lock mechanism 24 is actuated. As discussed in more detail subsequently, bias mechanism 42 further retains lock mechanism 24 in an actuated position after lock mechanism 24 is removed from engagement with the detent corresponding to the stowed position of the support arm and support arm 14 is pivoted from its stowed position.

Bias mechanism 42 includes a frame member 44, which, as shown, has a generally L-shaped configuration that defines the mechanism's upper wall 46 and end wall 48. End wall 48 includes a recess 50 with a pair of spaced-apart apertures (not shown), into which a pair of brass inserts 52 (shown in FIGS. 5–6) are housed to protect and provide a smooth operating surface through the apertures. A pair of guide pins 54 are inserted through the apertures and inserts 52 and secured to frame member 44 at one end by a pair of dowels 58. A spring 60 is positioned on each guide pin 54, and the end of each guide pin 54 distal frame member 44 is coupled to a kick plate 62 by another pair of dowels 64. Bias mechanism 42 further includes a cover plate 66, which is mounted on frame member 44 and protects the lower surface of each spring 60 and guide pin 54, just as upper wall 46 of frame member 44 protects the upper surfaces of the pins and springs.

Kick plate 62 has a concave region 68, which is sized and constructed to correspond to the shape of support arm 14 so that arm 14 is engaged and cradled by the kick plate when the arm is in its stowed position, as shown in FIGS. 2 and 3. When support arm 14 is in its stowed position, kick plate 62 is forced toward frame member 44, thereby compressing springs 60 and biasing mechanism 42 to urge support arm 14 to pivot away from base 12. Because kick plate 62 is supported and positioned by a pair of independent guide pins 54 and springs 60, it adjusts to the angular position of arm 14 as the arm is engaged initially by plate 62 as well as when the arm is in its fully stowed position. This also results in a generally uniform amount of force being exerted along arm 14 by bias mechanism 42. It should be understood that it is intended to be within the scope of the present invention that bias mechanism 42 could have a variety of alternative configurations, so long as the mechanism is engaged by support arm 14 when the arm is in its stowed position, and the bias mechanism causes the arm to pivot away from base 12 when support arm 14 is in its stowed position and lock mechanism 24 is actuated.

Apparatus 10 further includes a sensor 70, which detects when support arm 14 is in its stowed position. Preferably, sensor 70 includes or is in communication with an indicator, such as a light or other display to indicate to a user, crew member, etc. that the support arm is in its stowed position. Even more preferably, sensor 70 is in electronic communication with at least one indicator, which may be mounted on apparatus 10, but could also be mounted elsewhere on or adjacent the user's seat, or at a central readout, such as in the cockpit, crew compartment, etc.

As shown in FIGS. 5 and 6, sensor 70 includes a first component, namely a microswitch 72, which is mounted on frame member 44, and a second component 74, which is mounted on kick plate 62. When support arm 14 is in its intermediate or display positions, second component 74 is free from engagement with switch 72, and the switch therefore would output or display that support arm 14 is not in its stowed position. When arm 14 is in its stowed position, however, second component 74 is pushed into engagement with microswitch 72 as kick plate 62 is pushed toward frame member 44, and the engagement between the components generates a signal that the arm is in its stowed position. It should be understood that other configurations and placements for sensor 70 are possible, so long as sensor detects when support arm 14 is or is not in its stowed position.

Support arm 14 is shown in FIG. 4 and includes a pivot assembly 78, which is coupled pivotally to bearing insert 38 to enable the arm to pivot with respect to base 12. Pivot assembly 78 includes a generally cylindrical, tubular region 82 that is configured to be inserted and fastened within a first end 84 of the support arm's central portion 85. Pivot assembly 78 further includes a body region 86 with upper and lower portions, 88 and 90, respectively, which extend rearwardly from tubular region 82 and collectively define a cavity 92 through which bearing insert 38 is inserted. As shown in FIGS. 10–12, a fastening bolt 94 is passed through the ends of upper and lower portions 88 and 90. Bolt 94 is selectively loosened or tightened to adjust the frictional engagement of bearing insert 38 by body region 86, and thereby adjust the amount of force needed to pivot arm 14 with respect to base 12.

Body region 86 also defines a removed region 96, which is in communication with tubular portion 82 and forms a portion of the previously discussed passage into which cord 20 is threaded and housed so that it is protected from wear or damage and so that it does not interfere with the operation of apparatus 10. It should be understood that the passage extends from port 34, through removed region 96 and tubular 40 region 82, through central portion 85 support arm 14 to an exit port in mounting bracket 16. A cover plate 98 for removed region 96 is shown in FIG. 4. Plate 98 has a generally planar configuration that conforms to the shape of body region 86, and includes a recess 100 distal body region 86 into which one of rotational bearings 40 is positioned. It should be understood that the side of body region 86 opposite cover plate 98 defines a similar recess, into which the other rotational bearing is positioned.

Also shown in FIG. 4 is the support arm's central portion 85 which has an elongate, cylindrical configuration and opposed ends 84 and 104 that are secured respectively to tubular region 82 and mounting block 16. Central portion 85 is hollow and houses lock mechanism 24, the toggle 25 of which extends through an aperture along the length of arm 14. Central portion 85 may vary in length, depending largely upon the intended mounting position of apparatus 10. Factors to consider when determining the length of the central portion are the distance between base 12 and the floor or other lower limit to which display unit 18 can be pivoted (when coupled to arm 14) without striking the floor or other surface, as well as the distance about base 12 that the display unit should extend so that it is at a desired viewing height for a user. For most applications, central portion 85 should be between approximately five and approximately twelve inches, although special mounting positions or user heights may require lengths outside of this range.

Lock mechanism 24 is housed substantially within central portion 85 of arm 14. As shown in FIGS. 4 and 7–9, mechanism 24 includes a stabilizer 110 that is secured 4,7 in a defined position within arm 14, generally distal base 12, and which includes a flange-like member 116 extending transverse to the longitudinal axis of support arm 14. A limitation block 114 is rotationally mounted on stabilizer 110 between flange-like member 116 and the end of support arm 14 closest to base 12. A toggle 25 is mounted on limitation block 114 and extends through an aperture in support arm 14. Toggle 25 is configured to be grasped and rotated by a user to actuate lock mechanism 24. Limitation block 114 further includes a pair of guide pins 118, which are pivotally mounted on limitation block 114 by a dowel (not shown). Pins 118 each have a spring 120 mounted thereon and extend from block 114 away from base 12 and at least partially through a pair of slots 122 in flange-like member 116. It should be understood that each slot 122 is sized so that a portion of the corresponding guide pin 118 extends through it, but the corresponding spring 120 cannot pass through and instead is retained between limitation block 114 and flangelike member 116.

A linkage 124 is coupled by a pair of pins 125 between limitation block 114 and a locking assembly 126, which selectively engages one of the plurality of detents, or stops, on bearing insert 38 to retain selectively support arm 14 in a defined orientation with respect to base 12. Locking assembly 126 includes a linkage mount 128, which is secured by a pair of screws to one end of a chamber 134 distal mount 128, and a locking head 136 that is housed substantially within hollow chamber 134. Locking head 136 includes a tip 138. As shown, chamber 134 includes a collar 140 distal linkage mount 128, through which tip 138 extends. A spring 142 is housed within chamber 134 between linkage mount 128 and locking head 136. Spring 142 should be compressed somewhat within chamber 134 and should be of a suitable strength so that locking head 136 is at all times urged against collar 140 and so that tip 138 cannot easily overcome the spring's force and be forced into chamber 134.

Figure 7:
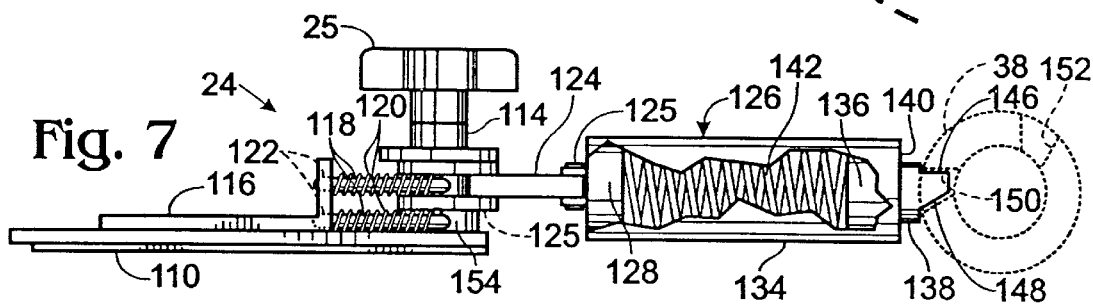
FIG. 7 is an enlarged detail showing the lock mechanism shown in FIG. 4 oriented to correspond to the stowed position of the support arm, with a portion of the locking assembly broken away to show details of internal construction.

Tip 138 has a pair of generally opposed surfaces, namely a first surface 146 that extends generally parallel to the longitudinal axis of chamber 134, and a second surface 148 that extends at a convergent angle with first surface 146 as it extends away from chamber 134. Surfaces 146 and 148 give tip 138 a generally tapered configuration. In FIG. 7, support arm 14 is shown in its stowed position, which is also shown in FIG. 10. In this position, tip 138 engages, or is received within, a first detent 150 on bearing insert 38. In the stowed position, lock mechanism 24 is in its starting or non-actuated position, in that toggle 25 has not been twisted by a user to rotate limitation block 114 and draw locking assembly 126 away from bearing insert 38. In FIGS. 7 and 10, a pair of detents are shown in dashed lines, namely the previously discussed first detent 150, which corresponds to the stowed position of the support arm, and a second detent 152, which corresponds to the support arm's display position. As shown, detents 150 and 152 are radially spaced-apart from each other along bearing insert 38, and each have a configuration that conforms to the shape of tip 138, and specifically the shape and orientation of the tip's first and second surfaces 146 and 148.

Figure 8:
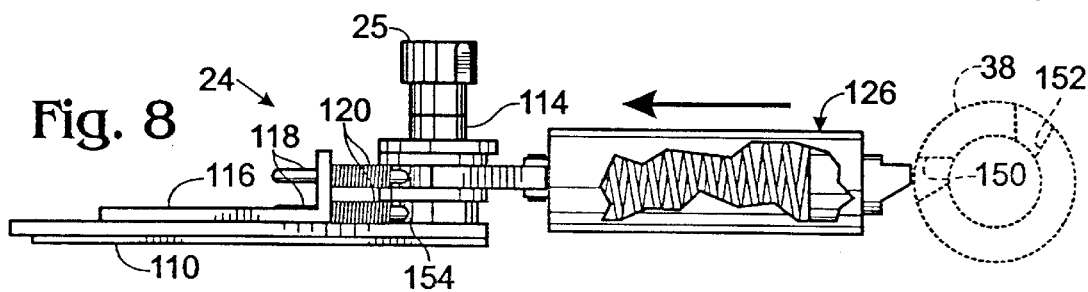
FIG. 8 shows the locking mechanism of FIG. 7 in an actuated position.

To remove support arm 14 from its stowed position, shown in FIGS. 7 and 10, a user simply twists toggle 25 to rotate limitation block 114 in the direction to cause locking assembly 126 to be drawn away from bearing insert 38. This removes tip 138 from engagement with first detent 150, as shown in FIG. 8. As shown, this rotation of limitation block 114 also causes guide pins 118 to extend further through slots 122 in flange-like member 116, thereby compressing springs 120 and biasing limitation block 114 and toggle 25 to return to their positions, shown in FIGS. 7 and 10. Once tip 138 is free from engagement with first detent 150, the previously described bias mechanism 42 causes the support arm to pivot away from its stowed position. This intermediate position is shown in FIG. 11. From the intermediate position shown in FIG. 11, it can be seen that first surface 146 generally faces first detent 150, and second surface 148 generally faces second detent 152.

It should be understood that toggle 25 should not rotate in a complete circle with respect to arm 14. Instead, toggle 25 rotates a defined radial distance with respect to arm 14. As shown in FIGS. 7 and 8, this distance is less than approximately 90°, and perhaps more approximately within the range of 40° and 75°. It should be understood, however, that the degree to which toggle 25 and limitation block 114 rotate with respect to arm 14 may vary, within limits defined by the distance tip 138 needs to be withdrawn to be freed from engagement with the plurality of detents on bearing insert 38, as well as the extent to which springs 120 may be compressed between limitation block 114 and flange-like member 116. In fact, limitation block 114 is named as such because, as shown in FIGS. 7 and 8, it contains a stop 154 that engages the lower guide pin 118 to halt the rotation of the block 114 with respect to arm 14. This limit prevents springs 120 from being compressed to the extent that they will deform and not return to their original configurations.

It should be understood that the intermediate position of support arm 14 is meant to include the entire range between adjacent detents. Furthermore, it is only necessary for bias mechanism 42 to pivot support arm 14 a few, perhaps even less than five, degrees away from its stowed position. Specifically, arm 14 must be pivoted away from its stowed position a sufficient distance so that tip 138 cannot be reinserted into first detent 150 when toggle 25 is released by the user, although bias mechanism 42 may pivot the support arm further away from its stowed position. Once support arm 14 is in its intermediate position, lock mechanism 24 is retained in its actuated position, shown in FIGS. 8 and 11, in which springs 120 are compressed and limitation block 114 and toggle 25 remain rotated with respect to their starting positions.

When in its intermediate position, support arm 14 is considered to be able to pivot freely within the range bounded by adjacent detents. By "pivoted freely" it is meant that tip 138 is not engaged by one of the detents or otherwise restricted from being translated radially with respect to bearing insert 38, however, there should preferably be some degree of resistance upon this pivotal movement, such as from springs 120. This friction is a safety factor which constrains support arm 14 from swinging or dropping quickly when tip 138 is freed from engagement with one of the detents.

To position support arm 14 in its display position, the arm is pivoted further away from its stowed position until tip 138 engages second detent 152, as shown in FIG. 12. Specifically, arm 14 is pivoted until tip 138 is aligned with second detent 152. Once aligned, springs 120 cause limitation block 114 and toggle 25 to return to their starting, unstressed positions, thereby causing locking assembly to move toward bearing insert 38 and tip 138 to engage or enter second detent 152. Between its stowed and display positions, support arm 14 may pivot between approximately 80° to approximately 270°, although this range is preferably between approximately 90° and approximately 200°, more preferably between approximately 100° and approximately 145°, and even more preferably between approximately 110° and approximately 130°, as shown in FIGS. 10–12.

Lock mechanism 24 may be constructed without spring 142, in which case locking assembly 126 could simply comprise a non-compressible base member, which is coupled pivotally to linkage 124, and which includes a tip extending away from limitation block 114 to engage sequentially the plurality of detents 144 on bearing insert 38, as discussed in more detail subsequently.

Figure 9:
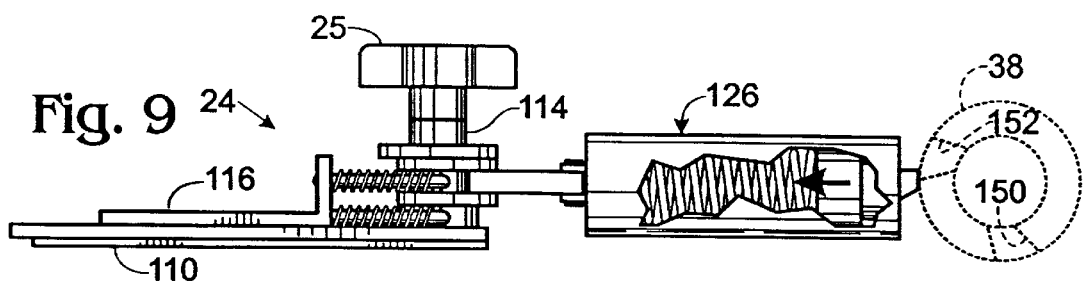
FIG. 9 shows the locking mechanism of FIG. 7, with the break-away mechanism actuated.

It is preferred, however, that locking assembly 126 include spring 142 because the spring enables locking assembly 126 to cooperate with tip 138 to comprise what is referred to herein as a break-away mechanism. The break-away mechanism enables tip 138 to be at least partially drawn within chamber 134, and out of engagement with the detents, when a sufficient, generally external, force is imparted upon apparatus 10. The shape of tip 138 and the compressibility of locking assembly 126 enable support arm 14 to "break away" from its display position and pivot toward its stowed position when lock mechanism 24 is actuated by a sufficient force is imparted to the support arm, mounting bracket or display unit in the general direction of the stowed position. The compressibility of locking assembly 126 enables tip 138 to be withdrawn at least partially within chamber 134, as shown in FIG. 9, even though toggle 25 and limitation block 114 have not been rotated with respect to support arm 14. Furthermore, the angular orientation of the tip's second surface 148 enables it to engage the corresponding side wall of second detent 152 and rise out of the detent. This movement is facilitated by the angular orientation of second surface 148 and detent 152, although it should be understood that the break-away mechanism would still operate if at least one of second surface 148 or detent 152 is not angled with respect to the longitudinal axis of chamber 134.

The break-away mechanism protects a user from being injured if a sudden change in the direction or speed of the airplane, or other vehicle in which apparatus 10 is used, causes the user or an adjacent passenger or crew member to strike support arm 14, mounting bracket 16 or display unit 18 while support arm 14 is in its display position. If this occurs, the break-away mechanism causes tip 138 to be removed from engagement with the detent corresponding to the display position of support arm 14, and the support arm is able to pivot toward or to its display position. As discussed above, it is preferable that the break-away mechanism is not actuated easily, so that less forceful, and often intentional, contact does not cause support arm 14 to pivot away from its display position. Furthermore, it is preferable for the break-away mechanism not to enable support arm 14 to "break away" from its stowed position and pivot toward its display position. This could cause the arm to pivot inadvertently or unexpectedly toward a user or other passenger or crew member and potentially injure that person or cause the display unit or other portion of the apparatus to strike another object and possibly be damaged.

It should be understood that bearing insert 38 could include more than two detents, in which case support arm 14 would have additional defined positions, where tip 138 is received within a detent to constrain arm 14 from pivoting with respect to base 12, with additional intermediate positions between the defined positions. Similarly, it is intended to be within the scope of the present invention that the placement and orientation of tip 138 and detents 150 and 152 may vary. Although the preferred arrangement is shown in the Figures and described above, it is possible that tip 138 could be mounted on base 12, with a bearing insert 38 or a similar structure with spaced-apart detents could be mounted on support arm 14.

By referring briefly back to FIG. 4, one can see that one pair of corresponding sides of chamber 134 and limitation block 114 are removed or flattened to define another portion of the passage though which cord 20 extends. From tubular region 82 of pivot assembly 78, cord 20 extends generally parallel to chamber 134, alongside limitation block 114 and through the remaining portion of support arm 14 to mounting bracket 16.

Figure 13:
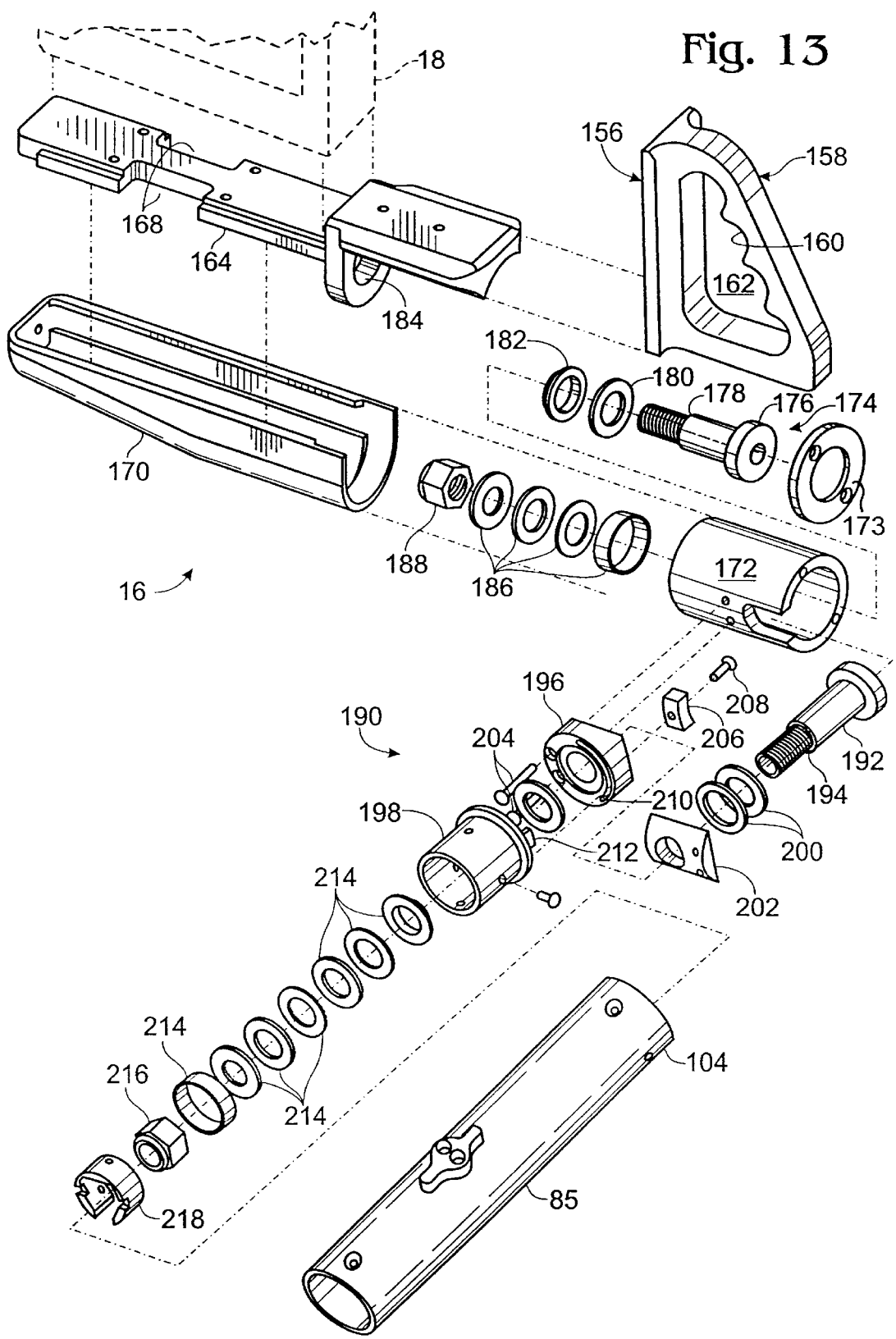
FIG. 13 is an isometric, exploded view of a portion of the support arm and the mounting bracket shown in FIG. 1.

In FIG. 13, mounting bracket 16 is shown in detail. Mounting bracket 16 is mounted on support arm 14 distal base 12 and provides a surface on which display unit 18 is secured. Mounting bracket 16 preferably engages and supports at least one, and preferably at least two, sides of display unit 18 so that the unit is supported against stress and other forces from at least two sides. Mounting bracket 16 further includes a handle 156 with a user-grippable region 158, which enables a user to adjust and position display unit 18 and the rest of apparatus 10 without having to grasp display unit 18, which would introduce dirt, grease and other contaminants to the display, as well as increase the chances of scratching or damaging the display. As shown, user-grippable region 158 includes a removed region 160 and an aperture 162 through which a portion of the user's hand may extend to grip the handle more firmly and securely.

Mounting bracket 16 is secured to support arm 14 and enables pivotal and rotational adjustment of the display unit with respect to the longitudinal axis of support arm 14. Specifically, it enables display unit 18 to rotate about the longitudinal axis of support arm 14 and to pivot with respect to an axis transverse to this axis. The combination of the pivotal and rotational adjustments of display unit 18 enables apparatus 10 to be adjusted selectively by users of varying sizes and with varying viewing preferences to orient display unit 18 to that user's preferred viewing position.

In FIG. 13, mounting bracket 16 is shown in detail. Mounting bracket 16 is configured to be mounted on support arm 14 distal base 12 and to provide a base plate 164 on which display unit 18 is secured. As shown, base plate 164 includes a pair of ports 168 through which a cord and an outlet may extend to connect to display unit 18. Prior to exiting though one of the ports, cord 20 is protected by a cover 170 that slides onto base plate 164 to protect the cord, as well as to prevent the connections between plate 164 and display unit 18 from being tampered with or damaged. As shown, plate 164 engages a first side of display unit 18, while handle 156 engages another.

Mounting bracket 16 further includes a generally cylindrical, substantially hollow housing 172 to which base plate 164 and handle 156 are secured. Housing 172 includes a removable end cap 173 and supports and provides a mount for a pair of assemblies, which enable the previously described pivotal and rotational adjustments of display unit with respect to support arm 14. Specifically, a pivot assembly 174 enables display unit 18 to pivot transverse to the longitudinal axis of support arm 14. Pivot assembly 174 includes a hollow pivot bolt 176, with an at least partially threaded shaft 178 that extends through a washer 180, a preferably brass insert 182, and through an aperture 184 in plate 164. Once inserted through aperture 184, a plurality of spacers and washers 186 are inserted on the shaft, which is prevented from being withdrawn through aperture 184 by a nut 188. Nut 188 may be tightened or loosened, selectively, to adjust the amount of force needed to cause the pivotal assembly to pivot with respect to the rest of mounting bracket 16.

The second assembly is a rotational assembly 190, which enables display unit 18 to rotate about the longitudinal axis of support arm 14 to further adjust the position of the display unit for viewing by a user. Rotational assembly 190 includes a bolt 192 with a shaft 194, similar to the previously described bolt 176 of pivotal assembly 174, a rotation base 196 and a tubular member 198. Bolt 192 extends through a pair of washers 200 and a shim 202, after which it further extends through the rotation base. As shown, rotation base 196 is mounted on housing 172 from one side by a pair of lateral pins 204, and by a spacer 206 and a pin 208 from the other.

Rotation base 196 includes an arcuate track 210, which extends radially around a portion of base 196. Base 196 is engaged rotatably by tubular member 198, which includes a tooth 212 that is received within track 210. Track 210 and tooth 212 cooperate to define the extent to which the display unit may be rotated about the longitudinal axis of support arm 14. In the configuration shown in FIG. 13, track 210 and tooth 212 enable the display unit to be rotated within a range of between approximately 80° and approximately 110°.

It should be understood that by varying the length of track 210 and the size of tooth 212, it is possible to enlarge or shorted the range to which the display unit may be rotated about the longitudinal axis of support arm 14. It is preferable that the display unit cannot spin, or rotate, entirely about support arm 14. Furthermore, by changing the radial alignment of track 210 on rotation base 196, it is possible to create, for example, right- and left-handed apparatus. By right- and left-handed, it is meant that the apparatus are designed to be mounted on the right or left side of a user, and to allow the display units mounted thereon to only pivot in direction from a starting position in which the display unit is oriented generally transverse to the user's light of sight.

After passing through rotation base 196 and tubular member 198, shaft 194 is passed through a plurality of spacers and washers 214, and a nut 216 and inner sleeve 218 are secured to the shaft to retain, frictionally, rotation base 196 in engagement with tubular member 198.

As shown in FIG. 13, housing 172 and assemblies 174 and 190 collectively define yet another portion of the passage through which cord 20 extends and is housed. From support arm 14, cord 20 extends through bolt 192 of rotational assembly 190, though housing 172 and bolt 176 of pivotal assembly 174 and into the cavity defined by base plate 164 and cover 170. From there, cord 20 is passed through either of ports 168 in plate 164 and ultimately coupled to display unit 18. Therefore, as discussed, the cord is protected from external contact and from interfering with the operation of apparatus 10 throughout its entire path through apparatus 10, from port 34 to ports 168.

In FIGS. 14–18, the previously discussed operative positions of apparatus 10 are presented collectively, from its stowed position, shown in FIG. 14, to its user-selected viewing position, shown in FIG. 18. FIGS. 15 and 16 correspond to FIGS. 11 and 12, respectively, where the support arm is in its intermediate and display positions. Once the support arm is secured in its display position, the display unit can be rotated about the longitudinal axis of the support arm to orient the display unit for viewing by the user. From the position shown in FIG. 16, the display unit is rotated approximately 90° in the direction of the arrow so that the unit's screen generally faces the user. Finally, the display unit is pivoted about an axis transverse to the longitudinal axis of the support arm to a user-selected viewing position. In FIG. 18, the display unit has been pivoted to an upright position, however, the dashed arrows indicate that it may be positioned selectively within an approximately 180° range to conform to the desired viewing position of a particular user.

While the present invention has been shown and described with reference to the foregoing preferred embodiment, it is to be understood by those of skill in the art that other changes in form and detail may be made therein without departing from the spirit and scope of the invention as defined in the following claims.

What is claimed is:

1. A support apparatus for a display unit, comprising:
   a base;
   a support arm pivotally coupled to the base, wherein the support arm is pivotal with respect to the base between a stowed position and a display position; and
   a lock mechanism substantially housed within the support arm, wherein the lock mechanism selectively engages the base to prevent pivotal movement of the support arm with respect to the base;
   wherein the base includes a bias mechanism configured to pivot the support arm away from the base when the support arm is in the stowed position and the lock mechanism is actuated.

2. The apparatus of claim 1, wherein the bias mechanism includes a kick plate that is shaped to engage at least a portion of the support arm when the support arm is in the stowed position and to pivot the support arm away from the base when the support arm is in the stowed position and the lock mechanism is actuated.

3. The apparatus of claim 1, wherein the base includes a sensor that detects when the support arm is in the stowed position.

4. The apparatus of claim 3, wherein the sensor is in electronic communication with an indicator.

5. The apparatus of claim 3, wherein the base includes a bias mechanism with a kick plate that engages at least a portion of the support arm when the arm is in the stowed position, the sensor includes a first portion mounted on the base and a second portion mounted on the kick plate, the first and second portions of the sensor engage each other when the support arm is in the stowed position, and the sensor detects the engagement of the first and the second portions, thereby indicating the support arm is in the stowed position.

6. The apparatus of claim 1, wherein the lock mechanism selectively prevents removal of the support arm from the stowed position and the display position until the lock mechanism is actuated.

7. The apparatus of claim 1 in combination with a display unit coupled to the support arm distal the base.

8. The apparatus of claim 7, wherein the apparatus further includes a mounting bracket mounted on the support arm, and wherein the display unit is mounted on the mounting bracket.

9. The apparatus of claim 8, wherein the mounting bracket includes a rotational assembly that enables the display unit to rotate about the long axis of the support arm.

10. The apparatus of claim 9, wherein the rotational assembly restricts the range of rotation of the support arm to less than 360°.

11. The apparatus of claim 9, wherein the rotational assembly restricts the range of rotation of the support arm to less than 180°.

12. The apparatus of claim 9, wherein the mounting bracket further includes a pivotal assembly that enables the display unit to pivot about an axis transverse to the long axis of the support arm.

13. The apparatus of claim 8, wherein the mounting bracket includes a handle with a user-grippable region.

14. The apparatus of claim 13, wherein the user-grippable region defines a removed region that facilitares a user and adjusting the apparatus.

15. The apparatus of claim 14, wherein the removed region includes an aperture through which at leas a portion of the user's hand can extend.

16. The apparatus of claim 1, wherein the display position of the support arm is oriented in the range of approximately 100° to approximately 145° with respect to the stowed position of the support arm.

17. The apparatus of claim 1, wherein the display position of the support arm is oriented in the range of approximately 110° to approximately 130° with respect to the stowed position of the support arm.

18. A support apparatus for a display unit comprising:
   a base including a hub with a plurality of spaced-apart detents;
   a support arm pivotally coupled to the base, wherein the support arm is pivotal with respect to the base between a stowed position and a display position; and
   a lock mechanism substantially housed within the support arm, wherein the lock mechanism selectively engages the base to prevent pivotal movement of the support arm with respect to the base, and wherein the lock mechanism includes a locking head with a tip that sequentially is received at least partially within respective ones of the plurality of detents as the support arm is pivoted to the stowed and the display positions.

19. The apparatus of claim 18, wherein the plurality of detents define an intermediate region on the hub between adjacent detents, and wherein the support arm is pivotal within a range defined by the intermediate region, with the tip of the lock mechanism slidably engaging the intermediate region and being free from engagement with the plurality of detents.

20. The apparatus of claim 19, wherein the lock mechanism is retained in an actuated position when the support arm is in the intermediate region.

21. The apparatus of claim 18, wherein the plurality of detents include a first detent, which defines the stowed position of the support arm, and a second detent, which defines the display position of the support arm.

22. The apparatus of claim 21, wherein the tip of the locking head includes a first surface that extends generally parallel to the longitudinal axis of the chamber, and a second surface that extends at a convergent angle with respect to the first surface as it extends away from the chamber.

23. The apparatus of claim 22, wherein the second detent conforms to the shape of the first and second surfaces of the tip.

24. A support apparatus for a display unit, comprising:

a base;

a support arm pivotally coupled to the base, wherein the support arm is pivotal with respect to the base between a stowed position and a display position; and a lock mechanism substantially housed within the support arm, wherein the lock mechanism selectively engages the base to prevent pivotal movement of the support arm with respect to the base, and wherein the lock mechanism includes a break-away mechanism that enables the support arm to pivot out of the display position when a sufficient force is imparted to the apparatus in the direction of the stowed position.

25. The apparatus of claim 24, wherein the break-away mechanism includes a chamber into which the locking head is housed, with a collar though which the tip of the locking head extends and a spring within the chamber that urges the locking head against the collar, wherein the bias mechanism is actuated by a force being imparted on the apparatus which causes the locking head to overcome the force exerted by the spring and the tip to be at least partially withdrawn into the chamber, thereby enabling the support arm to pivot toward the stowed position.

26. A support apparatus for a display unit, comprising:

a base;

a support arm pivotally coupled to the base, wherein the support arm is pivotal with respect to the base between a stowed position and a display position, and wherein the display position of the support arm is oriented in the range of approximately 80° to approximately 160° with respect to the stowed position of the support arm; and a lock mechanism substantially housed within the support arm, wherein the lock mechanism selectively engages the base to prevent pivotal movement of the support arm with respect to the base.

27. A support apparatus for a display unit, comprising:

a base;

a support arm pivotally coupled to the base, wherein the support arm is pivotal with respect to the base between a stowed position, an intermediate position and a display position; and a lock mechanism selectively retaining the support arm in a defined orientation with respect to the base, wherein the lock mechanism requires actuation to remove the support arm from the stowed and the display positions;

wherein one of the support arm or the base includes a plurality of spaced-apart stops, and the other of the support arm or the base includes the lock mechanism mounted thereon and oriented to sequentially engage the plurality of stops to retain sequentially the support arm in the stowed position and the display position.

28. The apparatus of claim 27, in combination with a display unit coupled to the support arm distal the base.

29. A stowable support apparatus for use with a display unit, the apparatus comprising:

a base;

a support arm pivotally coupled to the base, wherein the support arm is pivotal with respect to the base between a stowed position and a display position; and a sensor that detects when the support arm is in the stowed position.

30. The apparatus of claim 29, wherein the sensor is in electronic communication with an indicator for displaying whether the support arm is in the stowed position.

31. The apparatus of claim 30 in combination with a display unit coupled to the support arm.

\* \* \* \* \*